United States Patent
Lesmeister et al.

[11] Patent Number: 6,048,167
[45] Date of Patent: Apr. 11, 2000

[54] CONTAINER WITH EXPANDABLE SIDE WALLS AND METHOD

[75] Inventors: Jerome R. Lesmeister, Morris; David K. Evink, Hancock; Larry A. Krenz, Wheaton; James E. Lesmeister; Shawn L. Kellen, both of Morris, all of Minn.

[73] Assignee: Raymond Keith Foster, Madras, Oreg.

[21] Appl. No.: 09/009,676

[22] Filed: Jan. 20, 1998

Related U.S. Application Data

[62] Division of application No. 08/818,906, Mar. 17, 1997, Pat. No. 5,711,566, which is a continuation of application No. 08/428,568, Apr. 25, 1995, abandoned.

[51] Int. Cl.$^7$ .............................. B65F 9/00; B65G 67/04
[52] U.S. Cl. .......................... 414/809; 414/812; 414/813
[58] Field of Search ..................................... 414/809, 812, 414/813

[56] References Cited

U.S. PATENT DOCUMENTS

| | | |
|---|---|---|
| 3,070,850 | 1/1963 | McClure . |
| 3,080,187 | 3/1963 | Lamb . |
| 3,179,462 | 4/1965 | Hagen . |
| 3,367,675 | 2/1968 | Gearin . |
| 3,482,716 | 12/1969 | Leadley . |
| 3,719,386 | 3/1973 | Puckett et al. . |
| 3,744,839 | 7/1973 | Stoneburner . |
| 3,840,267 | 10/1974 | Honigman . |
| 3,915,492 | 10/1975 | Agnese . |
| 3,931,895 | 1/1976 | Grimaldo . |
| 4,049,310 | 9/1977 | Yoder . |
| 4,304,516 | 12/1981 | Schmidt et al. . |
| 4,358,133 | 11/1982 | Stucky . |
| 4,480,866 | 11/1984 | Komatsu . |
| 4,570,967 | 2/1986 | Allnutt . |
| 4,691,484 | 9/1987 | Wilson . |
| 4,943,106 | 7/1990 | Hunt . |
| 5,005,893 | 4/1991 | McCrary . |
| 5,044,870 | 9/1991 | Foster ...................................... 414/809 |
| 5,118,245 | 6/1992 | Dunkel . |
| 5,338,140 | 8/1994 | Ekdahl et al. ...................... 414/809 X |
| 5,354,113 | 10/1994 | Pettersson . |
| 5,361,724 | 11/1994 | Kuhns . |
| 5,398,986 | 3/1995 | Koob . |

*Primary Examiner*—Steven A. Bratlie
*Attorney, Agent, or Firm*—Delbert J. Barnard

[57] ABSTRACT

A container, such as a transfer trailer, a roll-off container, or other container that can be transported, has expandable side walls. The walls are hydraulically, or otherwise, forced outward to increase the inside width dimension of the container. A loading device, such as a garbage route collection truck or other similar vehicle can then be backed into the container whereby the solid material waste or other commodities can be directly loaded into the container. Once the container has been loaded, the side walls can be retracted to their original positions, such that the container maintains its standard regulated width dimension.

11 Claims, 9 Drawing Sheets

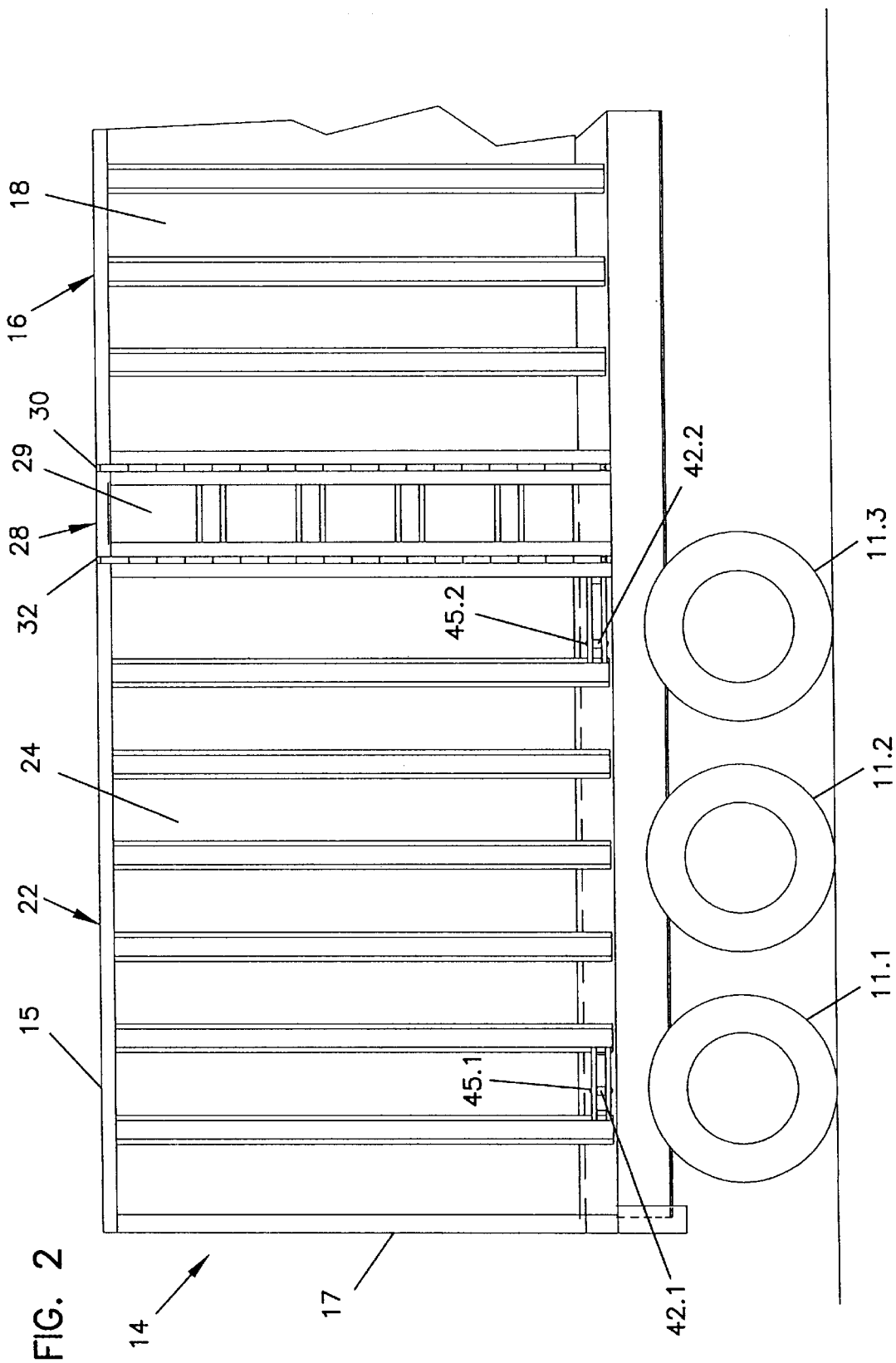

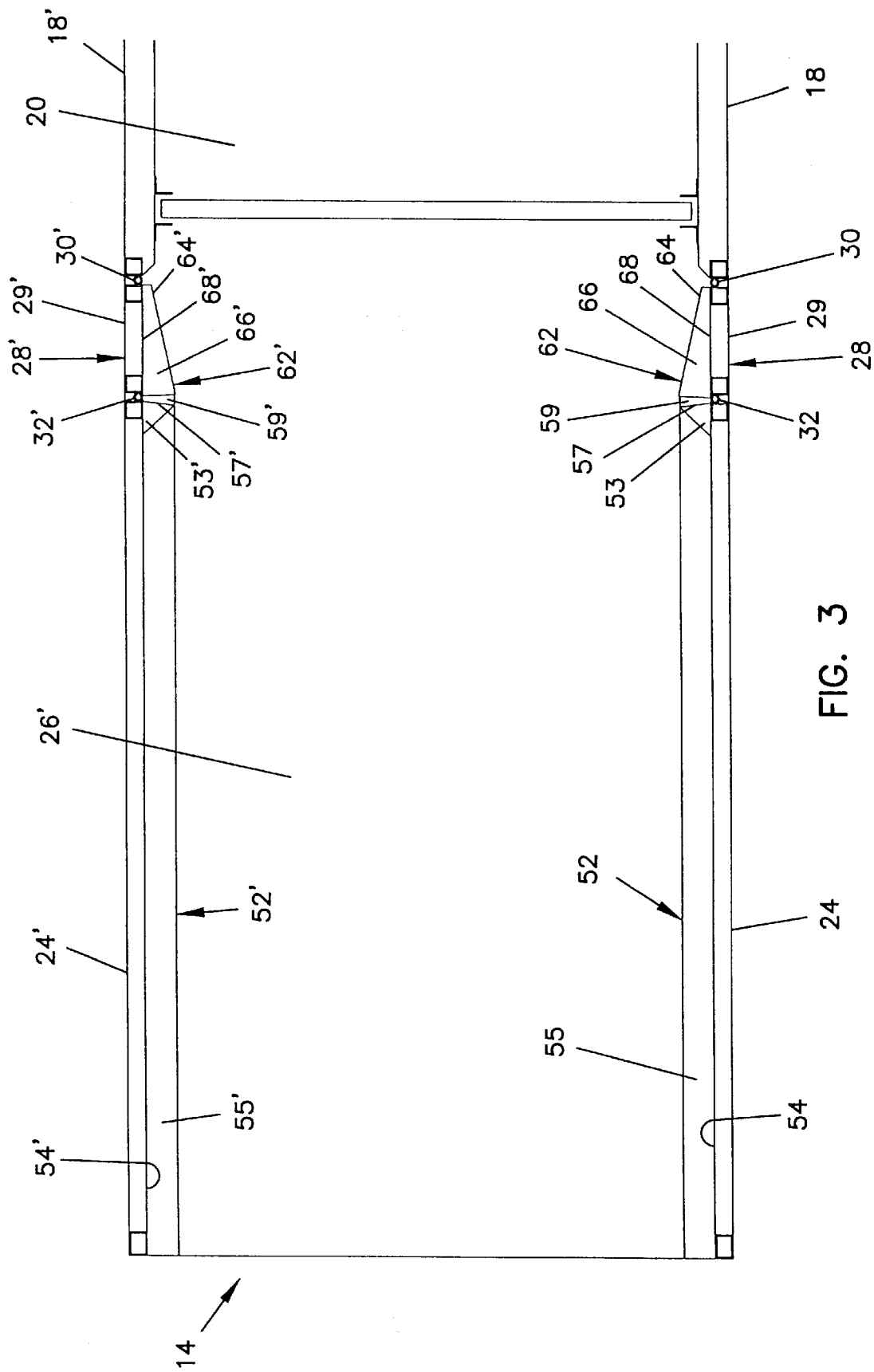

FIG. 9A
FIG. 9B
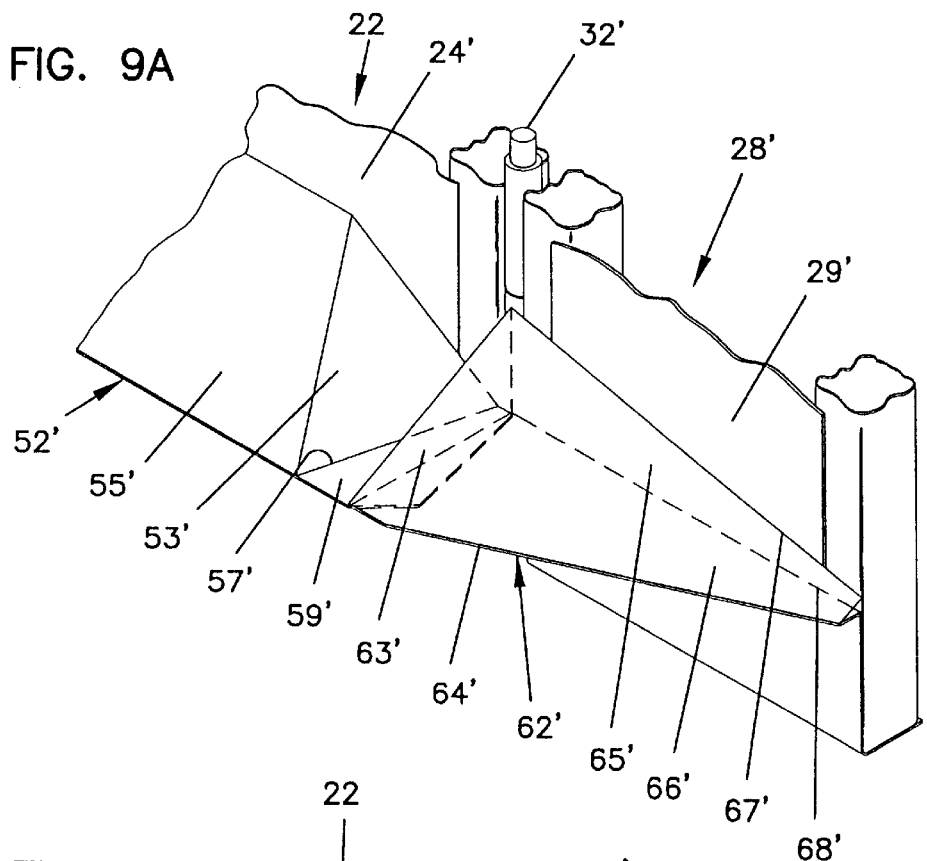
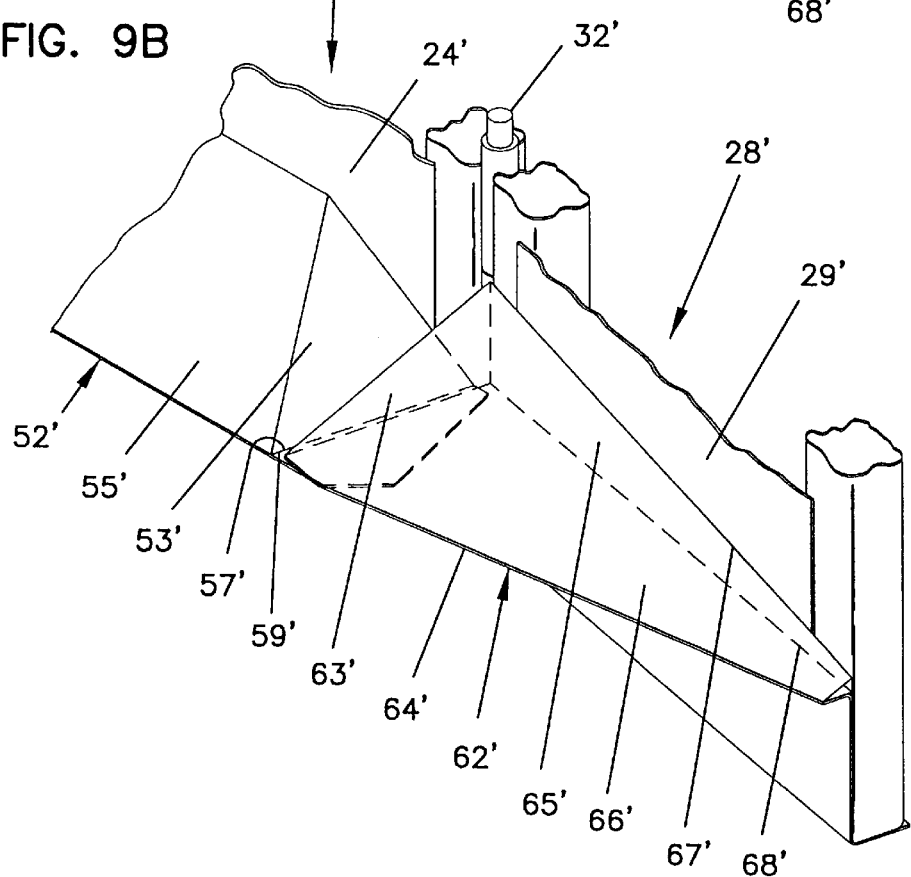

CONTAINER WITH EXPANDABLE SIDE WALLS AND METHOD

This application is a Divisional of application Ser. No. 08/818,906, filed Mar. 17, 1997, now U.S. Pat. No. 5,711,566; Ser. No. 08/818,906 is a continuation of application Ser. No. 08/428,568 filed on Apr. 25, 1995, now abandoned, which applications are incorporated herein by reference.

BACKGROUND OF THE INVENTION

1. Field of the Invention

This invention pertains to containers, such as transfer trailers, used for transporting solid material loads.

2. Description of the Related Art

Waste disposal within a community has typically been accomplished by using community landfills. Garbage route collection trucks pick up garbage from houses and local businesses and would transport the garbage to community landfills. This was an acceptable method when waste disposal for an entire community could be accommodated by smaller landfills.

With the ever increasing production and accumulation of garbage, however, community landfills are no longer adequate to accommodate disposal of an entire community's waste. Consequently, regional landfills are being increasingly developed and used to receive waste from multiple communities.

Regional landfills have made the transporting of garbage by garbage route collection trucks to the landfills impractical. Regional landfills are often located great distances from the communities in which the garbage route collection trucks pick up garbage. Thus, many areas have begun using transfer trailers or other containers, such as, for example, roll-off containers to transport solid waste material initially collected by garbage trucks to the regional landfill. This prevents the need for many smaller trucks making the same journey to the regional landfill. Thus, the use of transfer trailers or other containers to haul waste to a regional site is a more efficient and cost-effective method of transporting waste once it has been collected from homes and local businesses.

Typically, the garbage collected by a garbage route collection truck is taken to a transfer facility where the garbage is unloaded and then reloaded to a transfer trailer or other container using some type of loading machine. Garbage route collection trucks generally cannot dump their loads directly into transfer trailers or other containers because the maximum inside dimension of such containers is not larger than the outside dimension of the garbage route collection trucks. Thus, directly loading waste from the garbage route collection truck into the containers results in a large amount of waste being spilled. The width of transfer trailers and other containers is regulated by federal statutes and therefore, cannot be permanently enlarged to accommodate the size of garbage route collection trucks. On the other hand, efficiency demands require maximizing the amount of garbage that each individual garbage route collection truck can hold, thereby making it impractical to reduce the dimensions of the garbage route collection trucks.

What is needed is a transfer trailer or other container that can be efficiently transported, which is designed to accommodate the size of garbage route collection trucks for directly loading waste contained in the garbage trucks into the containers with minimal spillage of the waste.

SUMMARY OF THE INVENTION

According to a preferred embodiment of the present invention a container having expandable side walls is provided. The side walls of the container are expanded outwardly to increase the inside width dimension of the container. A garbage route collection truck can then back its end up into the container and load its waste directly into the container. Once the waste is loaded into the container, and the empty garbage truck pulls away, the side walls of the container are retracted to their original positions, thereby decreasing the width dimension of the container to its standard regulated size.

BRIEF DESCRIPTION OF THE DRAWINGS

FIG. 2 is an enlarged elevation partial side view of the trailer of FIG. 1;

FIG. 3 is a top plan view of the trailer of FIG. 1 shown with a top covering removed, showing rear side walls of the trailer in a retracted position;

FIG. 9A is a cutaway perspective view of the cooperation of the sealing flanges shown in the top view in FIG. 5, when the rear side wall is in the retracted position;

FIG. 9B is a cutaway perspective view of the cooperation of the sealing flanges of FIG. 9A, when the rear side wall is in the expanded position;

DETAILED DESCRIPTION OF THE PREFERRED EMBODIMENT

With reference now to the various drawing figures in which identical elements are numbered identically throughout, a description of the preferred embodiment of the present invention will now be provided.

Figure 1:
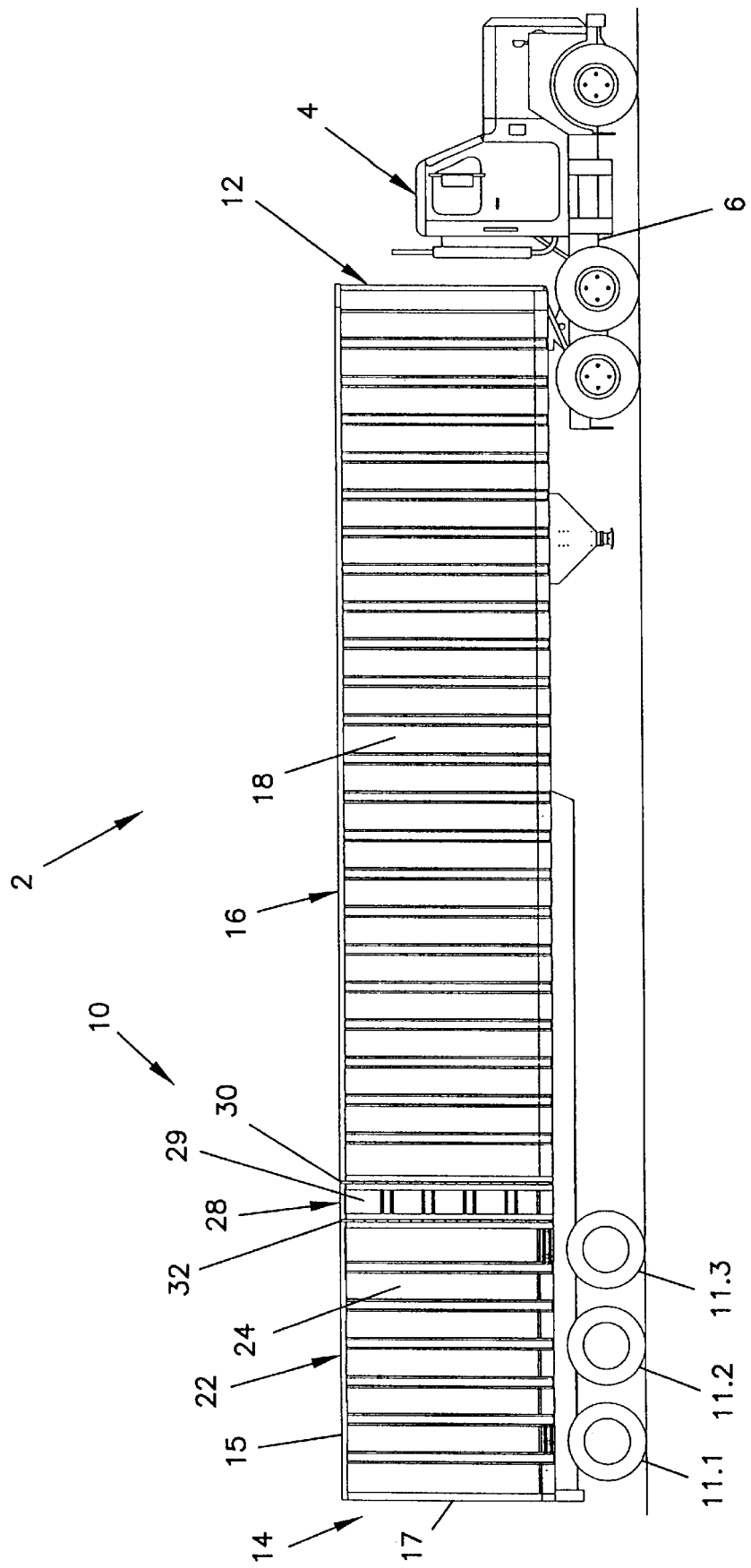
FIG. 1 is a an elevation side view of a truck with a trailer attached to a tractor according to a preferred embodiment of the present invention.

Referring to FIG. 1, a truck 2 is shown having a tractor 4 with a trailer 10 attached to a chassis 6. Tractors, such as the tractor 4 shown in FIG. 1 are well known in the art and can be of any type that allows a trailer for hauling solid material waste or other commodities to be attached thereto. The trailer 10 provides a container for receiving the solid material waste or other commodity in a container area within the trailer 10.

FIGS. 2 and 3 show a partial side view of the trailer 10 having wheels 11.1 through 11.3. The trailer 10 has a front trailer portion 16 having two side walls 18 and 18' and a floor 20. The front side walls 18 and 18' are non-movable portions of the trailer 10, in that they cannot expand outwardly. The trailer 10 also has a rear trailer portion 22 having two side walls 24 and 24' and a floor 26. In a preferred embodiment, the floors 20 and 26 comprise a movable floor, wherein multiple slats extend side-by-side from a front end 12 of the trailer 10 to a rear end 14 of the trailer 10. Each of the slats is longitudinally slidable relative to the side walls 18, 18', 24 and 24'. Such a floor enables material loads loaded into the trailer at the rear end 14 to be moved forward toward the front end 12 so that more can be loaded into the trailer 10 at the rear end 14. An example of such a movable floor which is used in the preferred embodiment is the Keith Running Floor II™ movable floor system by Keith Manufacturing Co. of Madras, Oreg. Although the movable floor system is used in the preferred embodiment, stationary floors or other types of floors can also be used in this invention. Furthermore, the alternative preferred embodiment of a roll-off container disclosed hereafter, typically does not utilize a movable floor system, because such containers are generally shorter in length than standard sized trailers and use a hoist system for unloading the containers.

The trailer 10 has a top covering 15 and a rear door 17 for containing the materials loaded into the trailer 10. In the preferred embodiment, a roll tarp, which is well known in the art, is used as the top covering 15. Also in the preferred embodiment, split doors with vertical hinges, which are well known in the art, are used for the rear door 17 of the trailer 10. It will be apparent to those in the art that a variety of different embodiments, beyond those disclosed with reference to the preferred embodiment of this invention, could be utilized for both the top covering 15 and the rear door 17. Other suitable embodiments of both a top covering and a rear door must be removable or sufficiently movable so as not to prevent loading devices, such as garbage collection trucks, from backing into the trailer rear end 14 and dumping their loads directly into the trailer 10.

Connecting the rear trailer portion 22 with the front trailer portion 16 are connector mechanisms 28 and 28'. Connector mechanism 28 has a front hinge 30 pivotally connected to front side wall 18 and a rear hinge 32 pivotally connected to rear side wall 24. A cross member 29 is pivotally connected between the front hinge 30 and the rear hinge 32. The connector mechanism 28' is essentially a mirror image of connector mechanism 28 connecting front side wall 18' with rear side wall 24'. A top view of connector mechanism 28' is shown in FIG. 3.

Figure 4A:
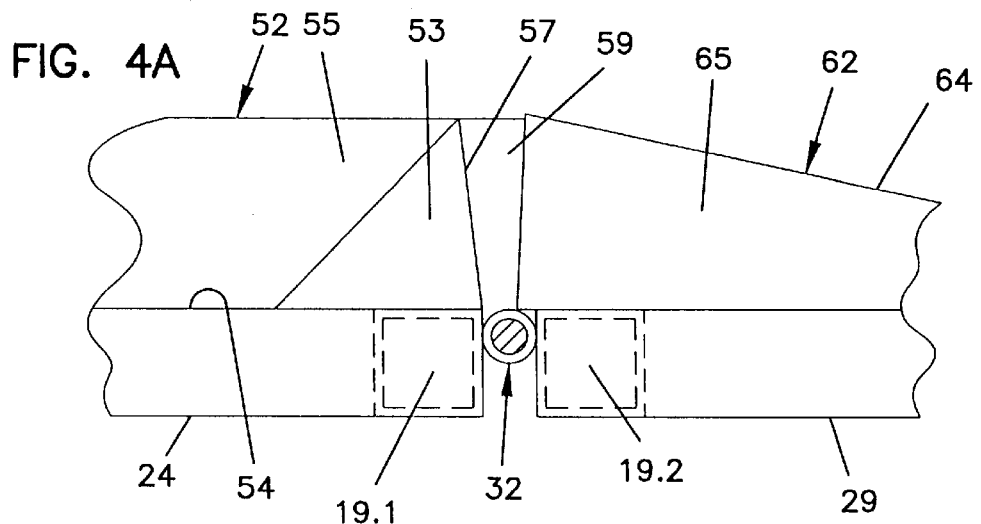
FIG. 4A is a detailed top plan view of a rear hinge of a connector mechanism shown in FIG. 3.
Figure 4B:
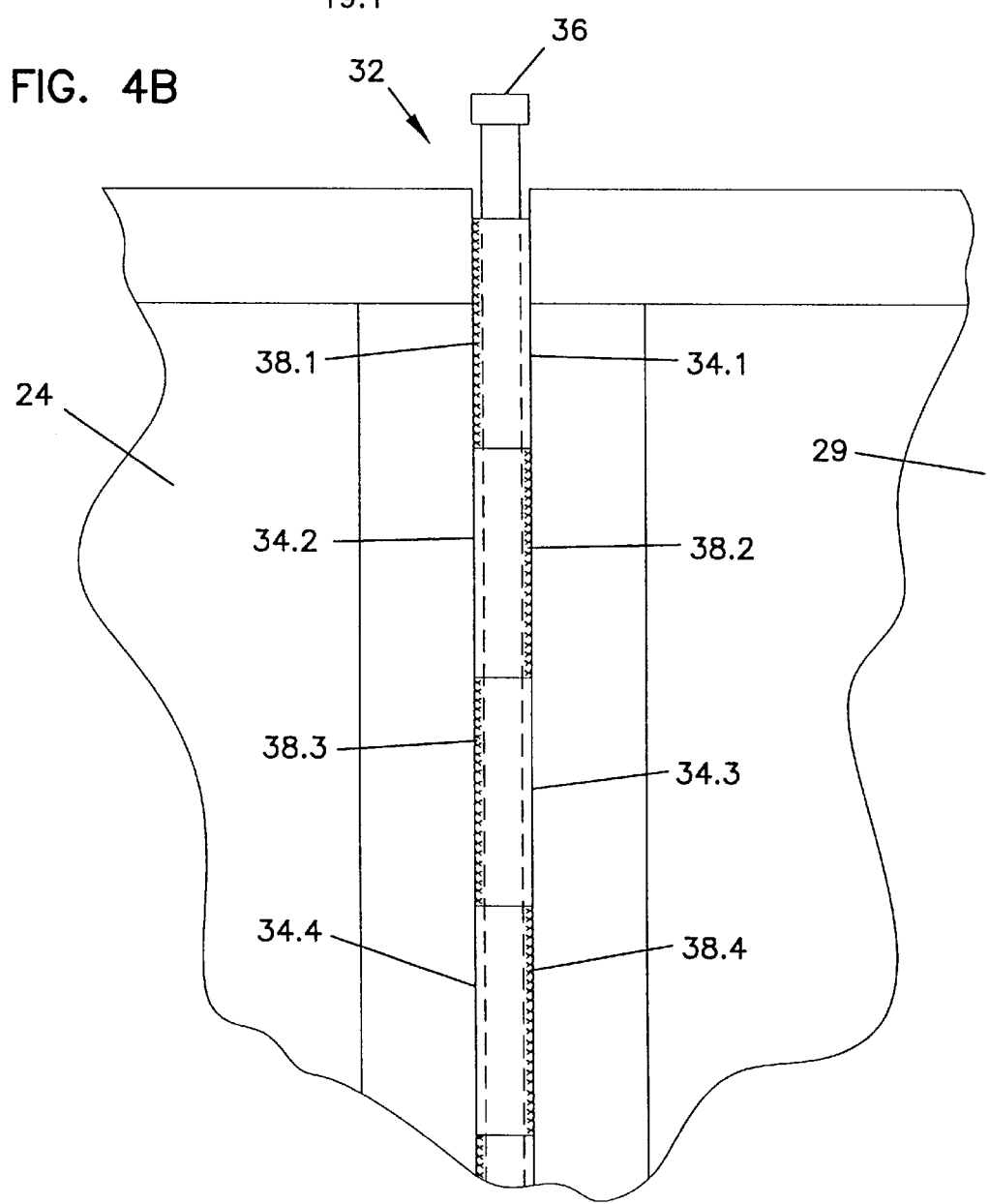
FIG. 4B is a detailed side view of the rear hinge shown in FIG. 4A.

A more detailed view of the preferred embodiment of the connector mechanisms 28 and 28' is shown in FIGS. 4A and 4B. FIGS. 4A and 4B show a detailed top view and a detailed side view, respectively, of the rear hinge 32 of the connector mechanism 28. The preferred embodiment is a typical hinge, utilizing multiple bushings, partially represented by 34.1, 34.2, 34.3, and 34.4, placed end-to-end and having a pin 36 disposed therethrough. The bushings 34 are alternately welded to the rear side wall 24 and the cross member 29. For example, bushings 34.1 and 34.3 are welded to rear side wall 24 and bushings 34.2 and 34.4 are welded to the cross member 29. The welded portion of bushings 34.1 through 34.4 are represented as 38.1 through 38.4, respectively.

FIGS. 4A and 4B show that the portions of the rear side wall 24 and the cross member 29, adjacent and welded to the bushings, are made of vertical square tubes 19.1 and 19.2, respectively. The front hinge 30 of connector mechanism 28 is identical to the rear hinge 32 shown in FIGS. 4A and 4B. In addition, it will be apparent that the connector mechanism 28' connecting rear side wall 24' to front side wall 18' is a mirror image of the connector mechanism 28.

It will be apparent to one skilled in the art that a single hinge connector mechanism could be used rather than the dual hinge connector mechanism shown and described with reference to the preferred embodiment of FIGS. 2 through 4. The dual hinge connector mechanism allows the side walls to expand outwardly, remaining parallel to their retracted positions. However, with a single hinge connector mechanism the side wall would pivot outwardly at an acute angle to the plane defined by the side wall while in the retracted position. In addition, other connector mechanisms allowing outward expansion of the side wall during loading are also possible.

Figure 5:
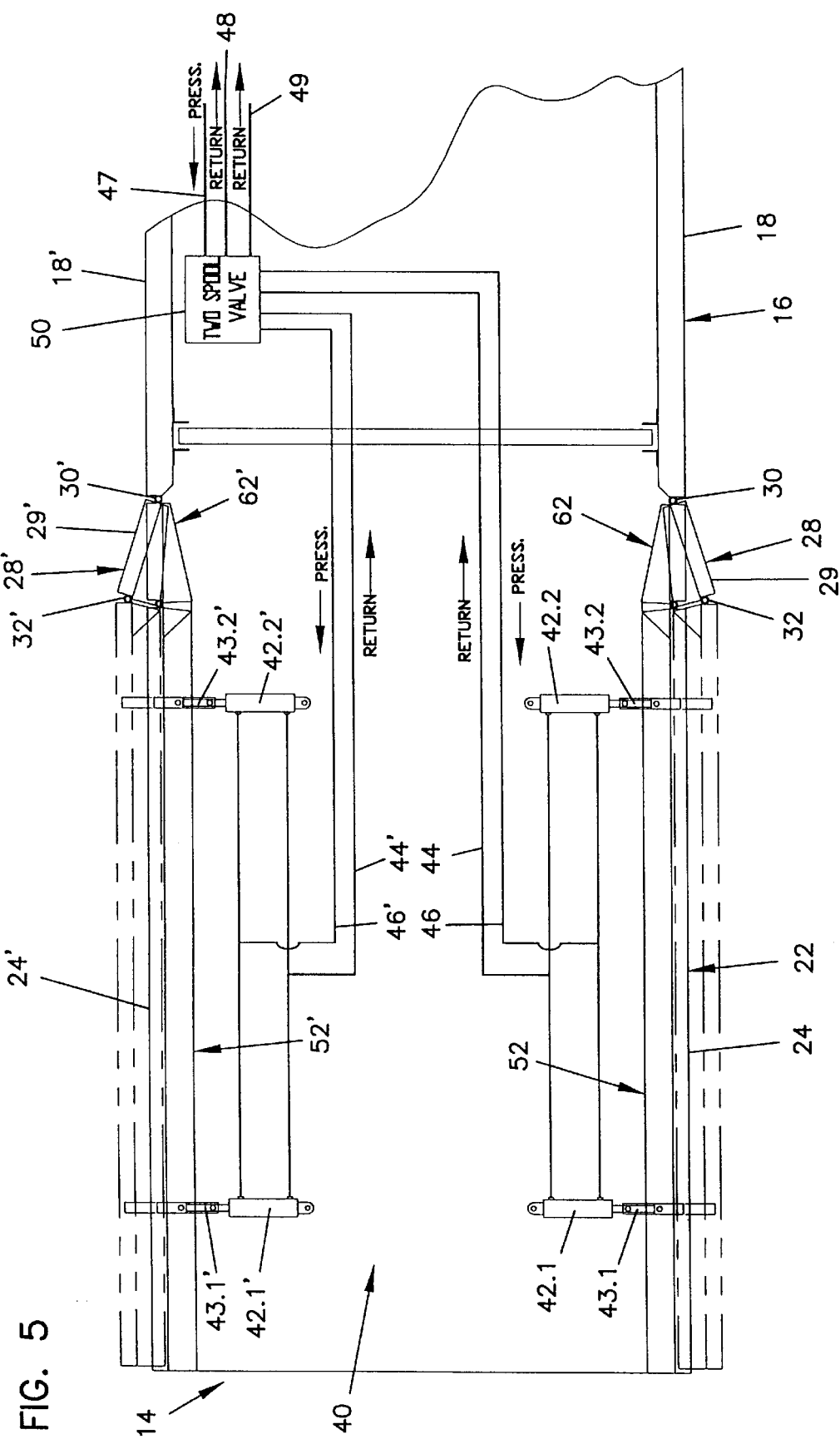
FIG. 5 is a partial top plan view of the trailer of FIG. 1 showing a hydraulic system with the rear side walls and connector mechanisms of the trailer and the hydraulic cylinders shown in solid lines in a retracted position and shown in phantom lines in an expanded position.
Figure 8A:
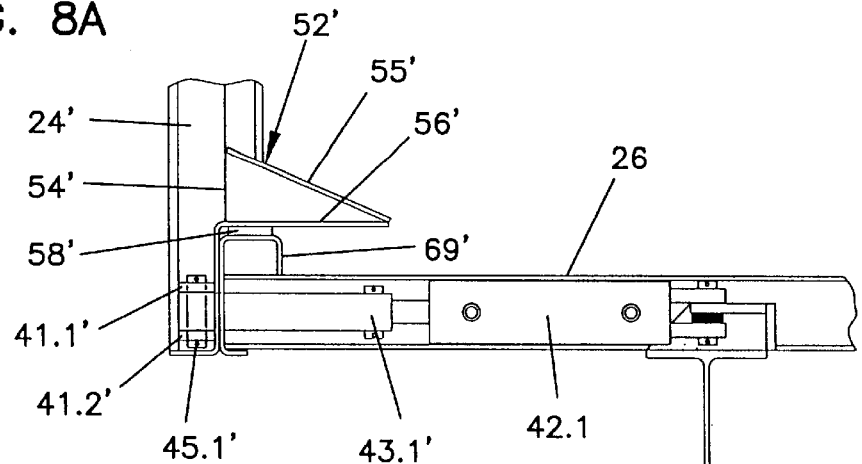
FIG. 8A is a detailed partial end view of the trailer of FIG. 7 with the rear side wall and a sealing flange shown in a retracted position.
Figure 8B:
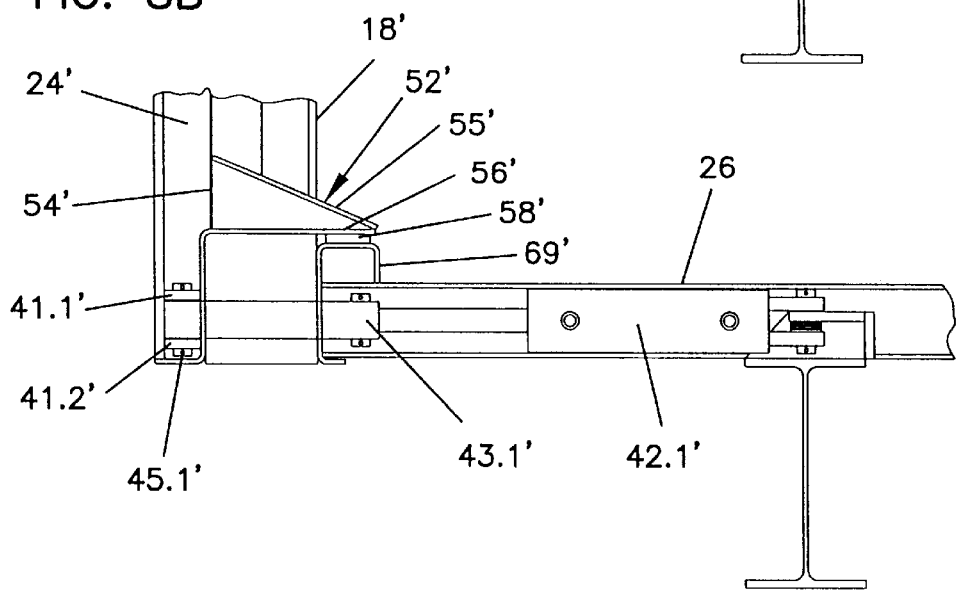
FIG. 8B is a detailed partial end view as shown in FIG. 8A, but with the rear side wall and the sealing flange shown in an expanded position.
Figure 6:
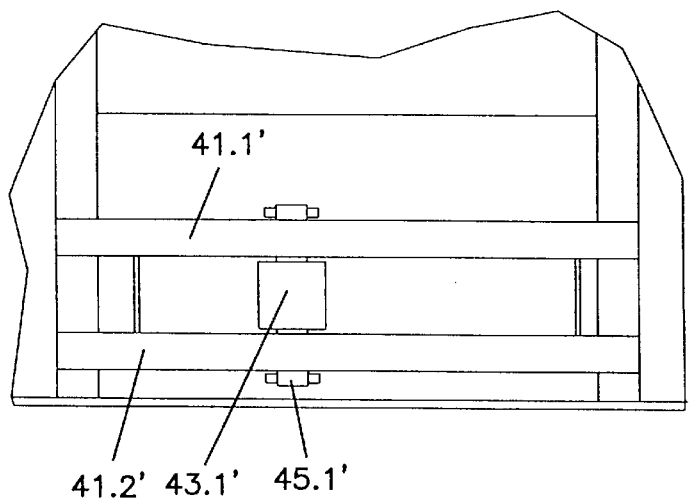
FIG. 6 is a detailed end view of one cylinder shown in FIG. 2.

FIG. 5 shows a controller 40, which is a hydraulic system, used in the preferred embodiment in the present invention to control the expansion and retraction of the rear side walls 24 and 24'. Hydraulic systems are well known in the art and therefore, those skilled in the art will readily understand this system and its possible variations. As shown in FIG. 5, the cylinders 42.1 and 42.2 have extension members 43.1 and 43.2 which are forced outwardly from the cylinders to expand the side wall 24 and pulled inwardly into the cylinders 42.1 and 42.2 to retract the side wall 24. As shown in FIG. 5, expansion and retraction of rear side wall 24' is also controlled by identical cylinders 42.1' and 42.2'. A two-spool valve 50, which is well known in the art, is mounted beneath the truck and has two levers or switches for actuating the hydraulic system. One lever actuates the cylinders 42.1 and 42.2 through hydraulic lines 44 and 46. The other lever actuates cylinders 42.1' and 42.2' through hydraulic lines 44' and 46'. In the preferred embodiment, the two-spool valve 50 is connected to the tractor 4, by hydraulic lines 47, 48 and 49, which supplies oil for operating the hydraulic system. A detailed side view of the cylinder 42.1' is shown in FIGS. 8A and 8B, with FIG. 8A showing the cylinder 42.1' in an actuated position and FIG. 8B showing the cylinder 42.1' in a non-actuated position. A detailed end view of the cylinder 42.1' is shown in FIG. 6. The extension member 43.1' of the cylinder 42.1' is shown pivotally bolted with a pin 45.1' through two support beams 41.1' and 41.2' in the rear side wall 24'. The other cylinders 42.1, 42.2 and 42.2' are configured in the same manner.

Figure 7:
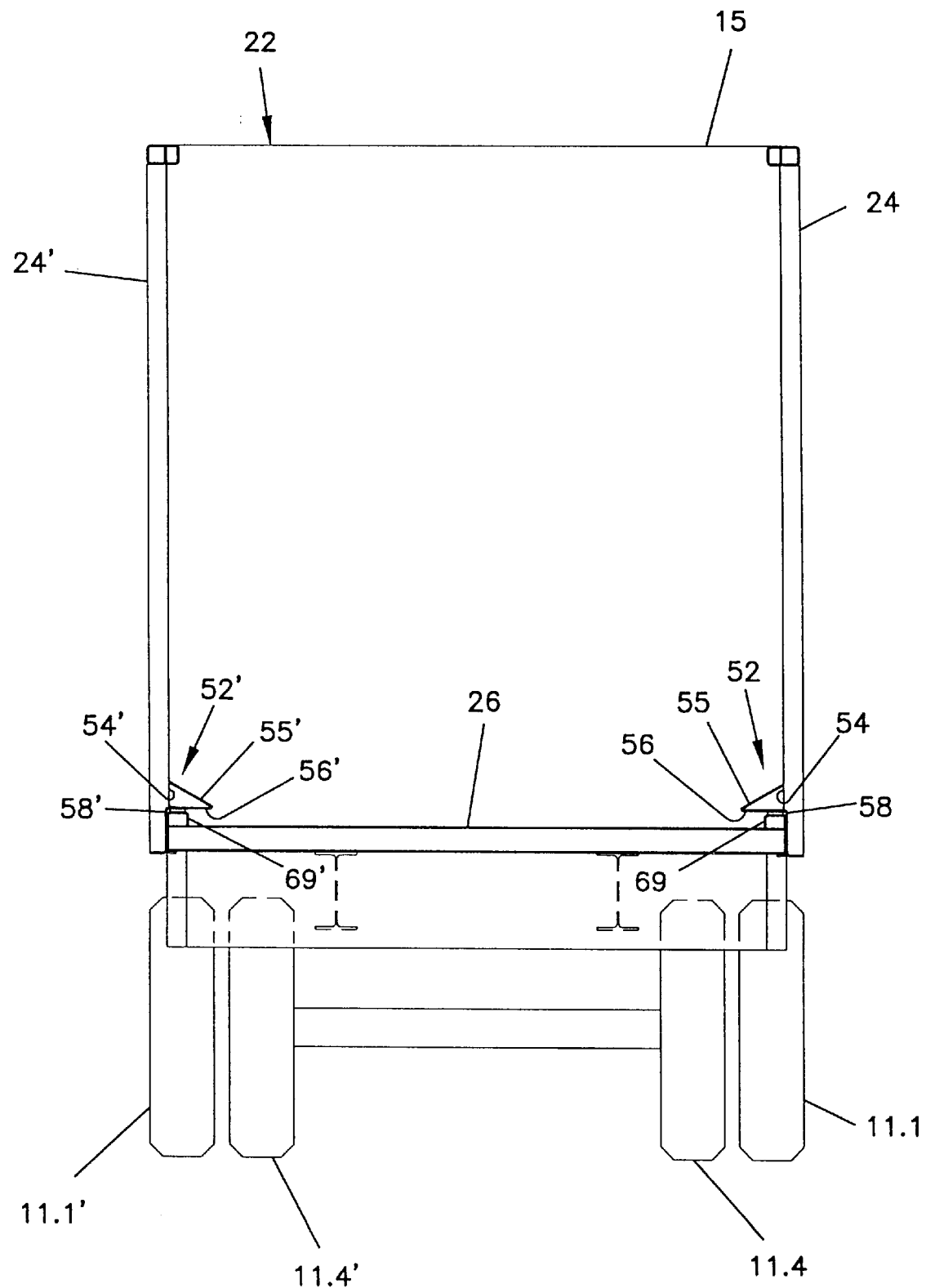
FIG. 7 is an end elevation view of the trailer of FIG. 1 shown with a rear door removed.

Referring now to FIG. 7 an end view of the rear trailer portion 22 of the truck is shown. Sealing flanges 52 and 52' are connected to the rear side walls 24 and 24', respectively. FIG. 5 shows that the sealing flanges 52 and 52' extend along the entire length of the rear side walls 24 and 24' respectively. An enlarged rear view of the sealing flange 52' attached to rear side wall 24' is shown in FIG. 8A wherein the rear side wall 24' is in the retracted position. FIG. 8B is the same view of the sealing flange 52' attached to the rear side wall 24' as in FIG. 8A, but shows the rear side wall 24' in the expanded position. A back side 54' of the sealing flange is fixedly attached to the rear side wall 24'. A bottom side 56' of the sealing flange 52' is substantially parallel to and spaced from the floor 26. A top side 55' of the sealing flange 52' tapers from the rear side wall outwardly toward the opposing rear side wall 24 and downwardly toward the floor 26.

A front side 53' of the sealing flange 52' is shown in FIGS. 3, 9A and 9B. The front side 53' opposes a connector sealing flange 62' attached to the connector mechanism 28'. The front side 53' tapers downward from the top side 55' of the sealing flange 52' toward the connector sealing flange 62'. In addition, a lower front edge 57' of the sealing flange 52', extending outwardly from the rear side wall 24' toward the opposing rear side wall 24, tapers away from the connector sealing flange 62', forming an acute angle with the rear side wall 24'. This creates a space between the sealing flange 52' and the connector sealing flange 62'.

Sealing flanges 62 and 62' are also connected to connector mechanisms 28 and 28' respectively, as shown from a top plan view in FIG. 5. A cutaway drawing of sealing flange 62' is shown in more detail in FIGS. 9A and 9B. As shown in FIG. 9A, a top member 65' and a bottom member 66' are attached to the connector mechanism 28' along their edges 67' and 68' respectively. The top and bottom members 65' and 66' extend outwardly from the connector mechanism 28' toward the opposing rear side wall 24. The bottom member 66' is substantially perpendicular to the connector mechanism 28'. The top member 65' tapers downward from the connector mechanism 28' and joins the bottom member 66' at a lower outer edge 64'. The lower outer edge 64' of the sealing flange 62' forms an acute angle with respect to the cross member 29'. It will be apparent to those in the art that the appropriate angle is determined based upon the distance that the attached rear side wall 24' can expand. In the preferred embodiment, a rear side 63' of the connector sealing flange 62' opposes the front side 53' of the sealing flange 52'. The rear side 63' extends outwardly from the connector mechanism 28' toward the opposing rear side wall 24, and tapers away from the sealing flange 52'. Finally, a plate 59' is connected to the bottom side 56' of the sealing flange 52' and extends outwardly toward, and slightly lower than, the bottom member 66' of the connector sealing flange 62'. The distance between the plate 59' and the bottom member 66' is sufficiently small to contain solid material waste or other commodities within the trailer.

In the preferred embodiment, the sealing flange 52 attached to the rear side wall 24 is a mirror image configuration of sealing flange 52' attached to the rear side wall 24'. Likewise, the connector sealing flange 62 attached to the connector mechanism 28 is a mirror image configuration of the connector sealing flange 62' attached to the connector mechanism 28'.

Referring back to FIGS. 8A and 8B, a slide member 58' is fixedly attached to the floor 26 by means of a bottom rail 69'. The slide member 58' is substantially in the shape of a rectangular box and slidably contacts the bottom side 56' of the sealing flange 52' and the bottom member 66' of the connector sealing flange 62'. Thus, the slide member 58' extends along the entire lengths of the sealing flanges 52' and 62'. In the preferred embodiment the slide member 58' is approximately 3 inches wide and is made of Ultra High Molecular Weight (U.H.M.W.) plastic to provide a surface against which the sealing flanges 52' and 62' will smoothly slide when the rear side wall 24' is expanding or retracting. Slide member 58 which contacts sealing flanges 52 and 62, is configured in the same manner as slide member 58'.

Figure 10:
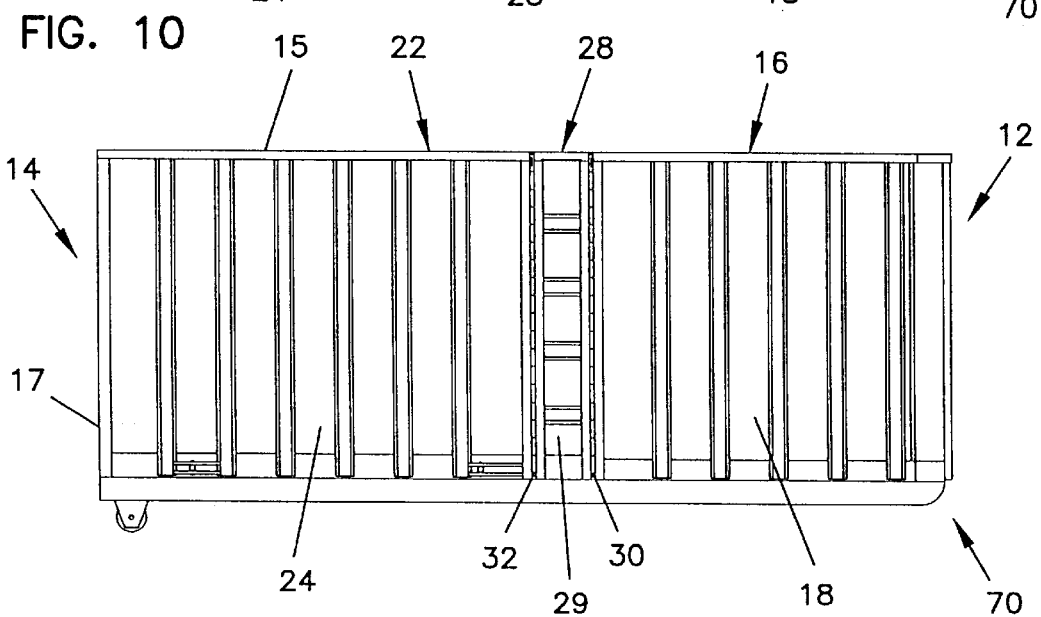
FIG. 10 is an elevation side view of an alternative preferred embodiment of a container according to the present invention.

Referring now to FIG. 10, a side view of an alternative preferred embodiment of the present invention is shown. The alternative embodiment is a roll-off container 70 having expandable side walls. A roll-off container is a container, generally shorter in length than a typical transfer trailer, that is attachable to a tractor and that can be rolled off the tractor before being loaded with solid waste materials or other commodities. Once the roll-off container is loaded, it can be hoisted back onto the tractor for transporting the loaded commodities. The structure of the roll-off container 70 having expandable side walls, shown in FIG. 10, can be configured in the same manner as the trailer 10 described herein. Such a configuration allows expansion and retraction of the side walls to minimize spillage when directly loading solid material waste or other commodities into the container from a loading apparatus such as a garbage route collection truck.

Figure 11B:
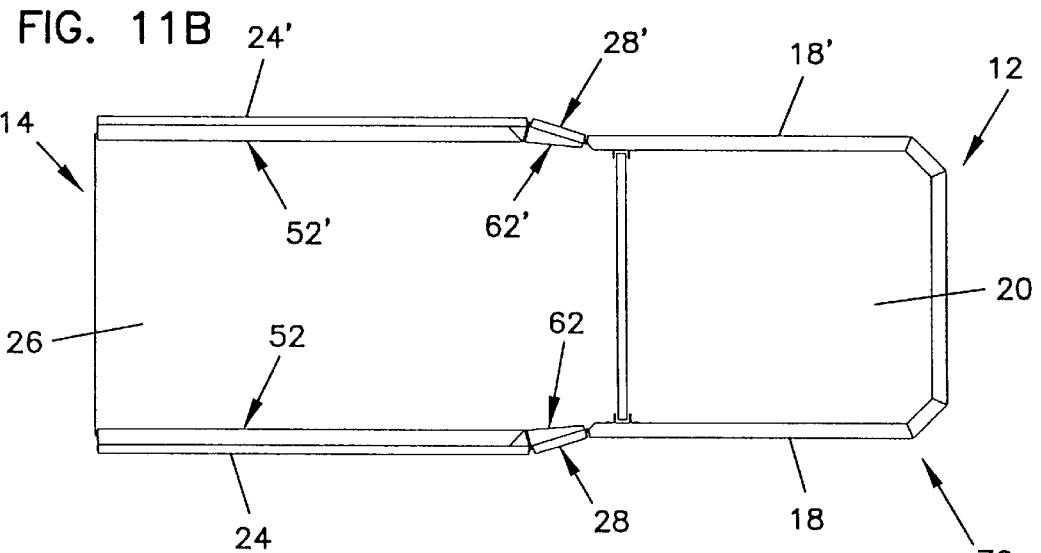
FIG. 11B is a top plan view of the container of FIG. 11A shown when the side walls are in an expanded position.
Figure 11A:
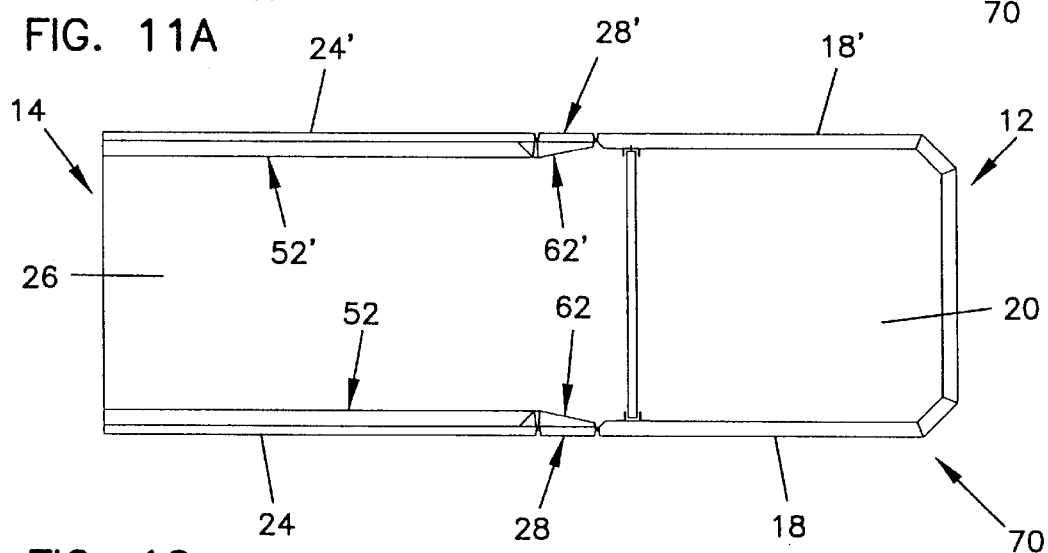
FIG. 11A is a top plan view of the container of FIG. 10 shown without a top covering, showing side walls of the container in a retracted position.

The parts of the roll-off container 70 shown in FIGS. 10, 11A and 11B are numbered identically to the parts of the trailer 10 shown in FIGS. 1 through 9. The container 70 is configured for receiving the solid material waste or other commodity in a container area within the container 70. The roll-off container has expandable vertical side walls 24 and 24' that are connected to non-movable portions shown generally at 18 and 18'. Connector mechanisms 28 and 28' connect the expandable side walls 24 and 24' with the non-movable portions 18 and 18', respectively. The connector mechanisms 28 and 28' each have a front hinge 30 and 30' pivotally connected to the non-movable portions 18 and 18'. Rear hinges 32 and 32' are pivotally attached to the vertical side walls 24 and 24' respectively. Finally, sealing flanges 52 and 52' are attached to vertical side walls 24 and 24' respectively, while connector sealing flanges 62 and 62' are attached to connector mechanisms 28 and 28' respectively. A container floor 26 is substantially perpendicular to the vertical side walls 24 and 24'.

It will be understood that the hydraulics and the side walls and the sealing flanges discussed with reference to the preferred embodiment of trailer 10, are implemented in the same manner in this alternative embodiment of a roll-off container 70 and in other similarly configured containers. In addition, it will be understood that the references to alternative configurations or variations with respect to the trailer 10 also apply to other similarly configured containers, such as the roll-off container 70.

Operation

FIG. 5 shows the expansion of the rear side walls 24 and 24' when the cylinders 42.1, 42.2, 42.1' and 42.2' are actuated. The expanded positions of the rear side walls 24 and 24' are represented by phantom lines, whereas the retracted positions of the rear side walls 24 and 24' are represented by solid lines. Similarly, the cylinders 42.1, 42.2, 42.1' and 42.2' are shown in actuated positions by phantom lines, and are shown in a non-actuated positions by solid lines. When the rear side walls 24 and 24' are in the retracted positions, they lie substantially in the same plane defined by the front side walls 18 and 18', respectively. Similarly, when the rear side walls 24 and 24' are in the retracted positions, the connector mechanisms 28 and 28' lie in substantially the same plane defined by front side walls 18 and 18', respectively.

To expand either of the rear side walls 24 or 24', the appropriate lever of the two spool valve 50 is engaged. When the lever for actuating the rear side wall 24 is engaged, pressurized oil flows through hydraulic line 46 to cylinders 42.1 and 42.2. The extension members 43.1 and 43.2 exert pressure upon the rear side wall 24, shown in solid lines. As the force against the rear side wall 24 increases, the connector mechanism 28 begins to pivot at the front hinge 30 and the rear hinge 32, and the rear side wall 24 expands outwardly and substantially parallel to its retracted position. The outward expansion causes some contraction of the length of the rear side wall 24. This is caused by the rear side wall 24 moving slightly toward the front trailer portion 16 as the rear side wall 24 expands. The extension members 43.1 and 43.2 of the cylinders 42.1 and 42.2, respectively, remain substantially perpendicular to the rear side wall 24 as it expands, because the extension members 43.1 and 43.2 pivot about the pins 45.1 and 45.2 shown and described with reference to FIGS. 2 and 6. Expansion of rear side wall 24' occurs in the same way as expansion of rear side wall 24.

After the rear side wall 24 has expanded, the lever for actuating the hydraulic cylinders 42.1 and 42.2 will default to a neutral position, allowing the rear side wall 24 to remain in the expanded position until the lever is disengaged. When the lever is disengaged, the oil returns through hydraulic line 44 to the two-spool valve 50 and then through hydraulic lines 48 and 49 to the tractor 4. As pressure from the extension members 43.1 and 43.2 is reduced, and the extension members 43.1 and 43.2 are pulled back into the cylinders 42.1 and 42.2, respectively, the rear side wall 24 is pulled back into the retracted position. The rear side wall 24' can be moved between the expanded position and the retracted position in the same manner as rear side wall 24. A separate lever, however, is provided on the two-spool valve 50 to actuate the cylinders 42.1' and 42.2' for controlling the movement of the rear side wall 24'. Finally, the levers controlling the rear side walls 24 and 24' can be engaged simultaneously or separately. The operation of hydraulic systems in the above-described manner is well known in the art.

In one alternative embodiment, only one of the rear side walls 24 or 24' would be expandable. It will be apparent that in an embodiment utilizing a single hinge connector mechanism, all of the cylinders used would be placed toward the rear end of the trailer 10, causing the rear side walls 24 and 24' to pivot outwardly at an angle to the plane defined by their retracted positions.

It will be apparent to those in the art that the hydraulics could be controlled by a hydraulic system in the truck, such as, for example, the hydraulically controlled running floor. In addition, the hydraulics could also be controlled by a hydraulic system separate and apart from the truck. It will be further apparent to one skilled in the art that the operation of the controller 40, of expanding and retracting the side walls, could be performed in a variety of ways. For example, electronics could be used for electrical control, a manual crank could be used for manual control, or air cylinders could be used to control movement of the side walls. Although hydraulics are used in the preferred embodiment, this invention is not limited by the method used to control expansion and retraction of the side walls.

The function of the sealing flanges 52 and 52' can be explained with reference to FIGS. 5, 8A, 8B, 9A and 9B. FIG. 8A shows the rear side wall 24' in the retracted position, whereas FIG. 8B shows the rear side wall 24' in the expanded position. As the rear side wall 24' expands, the bottom side 56' of the sealing flange 52' moves across the slide member 58'. As the rear side wall 24' moves away from the bottom rail 69', a gap is created between the rear side wall 24' and the bottom rail 69'. Because the sealing flange 52' extends along the entire length of the rear side wall 24' as shown in FIG. 5, the sealing flange 52' prevents the waste or other commodities being loaded onto the trailer from falling into the gap. The sealing flange 52 attached to the rear side wall 24, functions with respect to movement of the rear side wall 24 in the same way as sealing flange 52' functions with respect to movement of the rear side wall 24'.

Referring back to FIG. 5, the operation and function of the sealing flanges 62 and 62' is similar to the sealing flanges 52 and 52'. However, sealing flanges 62 and 62' seal gaps created between the connector mechanisms 28 and 28' and the bottom rails 69 and 69', respectively. The gaps are created when the connector mechanisms 28 and 28' pivot outwardly at an angle to the bottom rails 69 and 69' respectively, as the rear side walls 24 and 24' expand. The lower outer edges 64 and 64' of the sealing flanges 62 and 62' are appropriately angled with respect to the cross members 29 and 29' such that, as the rear side walls 24 and 24' expand, the lower outer edges 64 and 64' move to a position substantially parallel to the longitudinal axis of the bottom rails 69 and 69'. The sealing flanges 62 and 62' are sufficiently extended to ensure that the gaps between the connector mechanisms 28 and 28' and the bottom rails 69 and 69', created when the rear side walls 24 and 24' are in the expanded positions, are closed.

FIGS. 9A and 9B show the cooperation between the sealing flange 52' and the connector sealing flange 62'. FIG. 9A shows the sealing flanges 52' and 62' when the rear side wall 24' is in the retracted position. The plate 59' extends from the bottom side 56' of the sealing flange 52', across the space between the sealing flanges 52' and 62', to beneath the connector sealing flange 62'. This configuration of the plate 59' results in containment of solid material waste and other commodities within the trailer 10. As the rear side wall 24' expands, the sealing flange front side 53' and the connector sealing flange rear side 63' move toward each other. FIG. 9B shows the flanges 52' and 62' when the rear side wall 24' is completely expanded. When expanded, the sealing flanges 52' and 62' are configured such that the lower front edge 57' of the front sealing flange 52' lies adjacent and substantially parallel to the rear side 63' of connector sealing flange 62'; and the plate 59' is positioned adjacent to the connector sealing flange bottom member 66'. The tapered configuration of the front side 53' of the sealing flange 52' prevents waste or other commodities from becoming trapped between the flanges 52' and 62' as they move toward each other. It will be apparent to those in skilled in the art that the sealing flanges 52' and 62' could be configured in a variety of ways to allow expansion and retraction of the side walls while preventing spillage of waste. The sealing flanges 52 and 62 are configured to cooperate during expansion and retraction of rear side wall 24 in the same manner as the sealing flanges 52' and 62' cooperate during expansion and retraction of the rear side wall 24'.

The preferred embodiments of this invention as shown and described above, in addition to alternative embodiments referenced, provide a trailer or other container for loading garbage or other commodities directly from a garbage route collection truck or other similar vehicle. This invention minimizes the spillage of garbage or other commodities when being directly loaded into the trailer. While the invention has been disclosed with reference to the preferred embodiments, it will be appreciated that modifications and equivalents of the disclosed concepts may be apparent to those skilled in the art having the benefit of the teachings of the present invention. It is intended that the scope of the present invention not be limited by the specific embodiments shown above, but shall include such modifications and equivalents.

What is claimed is:

1. A method of collecting and transporting bulk material, comprising:

provided a first vehicle for transporting bulk material;

providing the first vehicle with an outlet at its rear end;

using the first vehicle to collect bulk material;

providing a second vehicle;

providing the second vehicle with a bulk material compartment having a combined inlet/outlet at its rear end;

expanding at least the rear portion of the bulk material compartment of the second vehicle laterally, to make it wider than its legal limit for road travel, and make its inlet/outlet wider than the outlet of the first vehicle;

moving one of the vehicles relative to the other vehicle to bring them together and place the outlet of the first vehicle into registry with the inlet/outlet of the bulk material compartment of the second vehicle;

transferring the bulk material out from the first vehicle, via its outlet into the second bulk material compartment of the second vehicle, via its combined inlet/outlet;

following transfer of the bulk material from the first vehicle to the second bulk material compartment of the second vehicle, contracting the width of the bulk material compartment of the second vehicle back to a legal width for road travel;

transporting the second vehicle to a receiving site for the bulk material; and at said receiving site, discharging the bulk material from the second bulk material receiving compartment via its inlet/outlet.

2. A method according to claim 1, further comprising providing the second vehicle with a reciprocating slat conveyor as a floor in the bulk material compartment of the second vehicle.

3. A method according to claim 1, comprising providing the second vehicle with a bulk material compartment that can receive more bulk material than is carried by the first vehicle.

4. A method according to claim 3, further comprising providing the second vehicle with a reciprocating slat conveyor as a floor in the bulk material compartment of the second vehicle.

5. A method according to claim 1, comprising transferring bulk material into the bulk material receiving compartment of the second vehicle until a desired amount of the bulk material is within the bulk material compartment of the second vehicle, and then transporting the second vehicle to the receiving site and at the receiving site discharging the bulk material from the bulk material compartment.

6. A method according to claim 5, further comprising providing the second vehicle with a reciprocating slat conveyor as a floor in the bulk material compartment of the second vehicle.

7. A method of collecting and transporting refuse to a receiving site, comprising:

providing a collection vehicle for collecting refuse;

introducing refuse into said collection vehicle as the refuse is collected;

providing a transport vehicle having a second refuse receiving compartment sized to carry more refuse than the collection vehicle;

providing the refuse receiving compartment of the transport vehicle with a refuse inlet/outlet in a rear portion of its refuse receiving compartment;

expanding at least a portion of the refuse receiving compartment, in the vicinity of the refuse inlet, to make it wider than its legal limit for road travel, and wider than a refuse carrying portion of the collection vehicle;

moving one of said vehicles relative to the other to bring them together and place a rear outlet of the collection vehicle into registry with the inlet/outlet of the refuse receiving compartment of the transport vehicle;

transferring the refuse out from the collection vehicle, via its rear outlet, into the transport refuse receiving compartment of the transport vehicle, via its inlet/outlet;

following transfer of the refuse from the collection vehicle to the transport vehicle, contracting the expanded portion of the refuse receiving compartment of the transport vehicle to a legal width for road travel;

transporting the transport vehicle to the receiving site for the refuse; and at said receiving site, discharging the refuse from the second refuse receiving compartment via its inlet/outlet.

8. A method according to claim 7, further comprising providing the transport vehicle with a reciprocating slat conveyor as a floor in the second refuse receiving compartment of the transport vehicle, for receiving and moving the bulk material.

9. A method according to claim 8, comprising using the reciprocating slat conveyor for moving the refuse forwardly in the refuse receiving compartment of the transport vehicle following transfer of the refuse from the collection vehicle into the refuse receiving compartment of the transport vehicle.

10. A method according to claim 7, comprising providing the transport vehicle with a refuse receiving compartment that has more refuse carrying capacity than the collection vehicle.

11. A method according to claim 10, further comprising providing the transport vehicle with a reciprocating slat conveyor as a floor in its refuse receiving compartment, for receiving and moving the bulk material.

* * * * *